US008451765B2

(12) United States Patent
Wang et al.

(10) Patent No.: US 8,451,765 B2
(45) Date of Patent: May 28, 2013

(54) METHOD, SYSTEM AND BASE STATION FOR TRANSMITTING MBMS IN SINGLE FREQUENCY NETWORK

(75) Inventors: Yingmin Wang, Beijing (CN); Yu Ding, Beijing (CN); Hongyan Xu, Beijing (CN); Shiyan Ren, Beijing (CN); Yuemin Cai, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 496 days.

(21) Appl. No.: 12/532,015

(22) PCT Filed: Mar. 20, 2008

(86) PCT No.: PCT/CN2008/000552
§ 371 (c)(1),
(2), (4) Date: Nov. 19, 2009

(87) PCT Pub. No.: WO2008/113260
PCT Pub. Date: Sep. 25, 2008

(65) Prior Publication Data
US 2010/0103855 A1  Apr. 29, 2010

(30) Foreign Application Priority Data
Mar. 20, 2007  (CN) .......................... 2007 1 0064571

(51) Int. Cl.
*H04H 20/71* (2008.01)
(52) U.S. Cl.
USPC ....................................................... 370/312
(58) Field of Classification Search
None
See application file for complete search history.

(56) References Cited

U.S. PATENT DOCUMENTS

| | | | | | |
|---|---|---|---|---|---|
| 4,484,194 | A | * | 11/1984 | Arvidsson ..................... | 342/174 |
| 5,914,932 | A | * | 6/1999 | Suzuki et al. ................. | 370/203 |
| 6,137,825 | A | * | 10/2000 | Sekine et al. ................. | 375/130 |
| 2010/0103855 | A1 | * | 4/2010 | Wang et al. ................... | 370/312 |

FOREIGN PATENT DOCUMENTS

| | | |
|---|---|---|
| CN | 1270548 C | 8/2006 |
| CN | 1833413 A | 9/2006 |
| CN | 1836387 A | 9/2006 |
| EP | 1387591 A1 | 2/2004 |
| EP | 1505793 A1 | 2/2005 |
| EP | 1509056 A2 | 2/2005 |

OTHER PUBLICATIONS

International Search Report for International Application No. PCT/CN2008/000552, dated Jun. 26, 2008.

* cited by examiner

*Primary Examiner* — Xavier Szewai Wong
*Assistant Examiner* — Leon Andrews
(74) *Attorney, Agent, or Firm* — Barnes & Thornburg LLP

(57) ABSTRACT

A method includes: sending, by an RNC, MBMS data to base stations of the target cells or sectors, distributing the same time and frequency resources, scrambling code and midamble to the cells or sectors to transmit the MBMS data, sending information of the distributed resources, scrambling code and midamble to the base stations and UEs of the target cells or sectors; and rotating, by each of the base stations, the MBMS burst signal to be sent by a random phase, sending the rotated signal to the UE using time and frequency resources distributed by RNC. A system includes an RNC, base stations and a UE, and each of the base stations includes a phase processing module and a signal sending module.

5 Claims, 2 Drawing Sheets

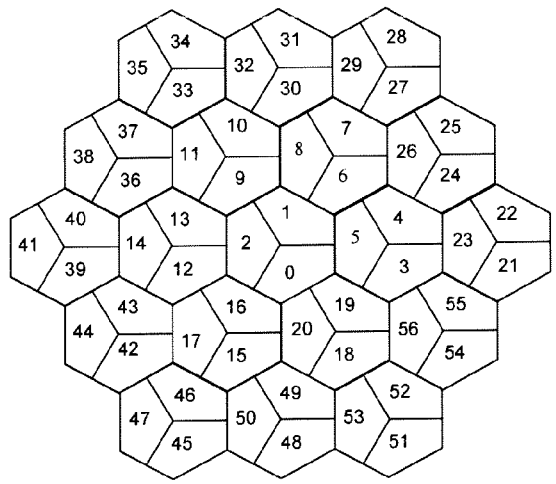

Fig. 1

--Prior Art--

```
┌─────────────────────────────────────────────────┐
│ RNC determines the target cells or sectors of   │  20
│ the broadcast/multicast service data            │
└─────────────────────────────────────────────────┘
                      │
                      ▼
┌─────────────────────────────────────────────────┐
│ RNC allocates the same time and frequency       │
│ resources, scrambling code and midamble to the  │  21
│ target cells or sectors, notifies the same to   │
│ Node Bs and UEs of the target cells or sectors, │
│ and distributes the service data                │
└─────────────────────────────────────────────────┘
                      │
                      ▼
┌─────────────────────────────────────────────────┐
│ Node B performs frequency spreading and         │  22
│ scrambling processes on the broadcast/multicast │
│ service data, to form a broadcast/multicast     │
│ service burst signal                            │
└─────────────────────────────────────────────────┘
                      │
                      ▼
┌─────────────────────────────────────────────────┐
│ Node B rotates the broadcast/multicast service  │  23
│ burst signal by a random phase, and sends the   │
│ rotated signal to the UE                        │
└─────────────────────────────────────────────────┘
                      │
                      ▼
┌─────────────────────────────────────────────────┐
│ The UE performs channel estimation, de-         │
│ spreading and descrambling processes on the     │  24
│ received broadcast/multicast service burst      │
│ signal, to obtain the broadcast/multicast       │
│ service data                                    │
└─────────────────────────────────────────────────┘
```

Fig. 2

METHOD, SYSTEM AND BASE STATION FOR TRANSMITTING MBMS IN SINGLE FREQUENCY NETWORK

CROSS-REFERENCE TO RELATED APPLICATIONS

Priority is claimed with respect to Chinese patent application No. 200710064571.1 filed on Mar. 20, 2007, the disclosure of which is incorporated herein by reference in its entirety.

FIELD OF THE INVENTION

The present invention relates to the field of mobile communication, and in particular, to a method, a system and a base station for transmitting a broadcast/multicast service.

BACKGROUND OF THE INVENTION

With the rapid development of mobile communication and the Internet, a large number of mobile multimedia services have emerged, and in some of the services, such as video on demand, television broadcast, video conference, online education, and an interactive game, it is necessary for a plurality of users to receive the same data simultaneously. These mobile multimedia services are characterized by a large amount of data and long duration, compared with the common data services. In order to utilize mobile network resources efficiently, 3GPP, which is a global organization for standardization, has proposed Multimedia Broadcast/Multicast Service (MBMS). MBMS refers to a point-to-multipoint service for sending data to multiple users by one data source, which implements sharing of network resources including the mobile core network and access network, especially sharing of the air interface resource. Unlike Cell Broadcast Service (CBS) in the existing mobile network, which allows data of a low bit rate to be sent to all users through a cell shared broadcast channel and is a service based on message, MBMS defined by 3GPP can implement not only the message type multicast and broadcast of plain text at a low rate, but also the multicast and broadcast of a multimedia service at a high rate, such as a mobile TV service.

However, in the system defined by the original 3GPP Release 6, MBMS has a low spectrum efficiency, which is typically 0.2 to 0.02 bit/Hz/s. Therefore, in Long Term Evolution (LTE) project, 3GPP starts the study on Enhanced Multimedia Broadcast/Multicast Service (E-MBMS), and has introduced the Single Frequency Network (SFN) technology from the existing industrial terrestrial broadcast standard (e.g. DVB-H, MediaFLO, etc). Particularly, in all cells or sectors in the SFN, the same MBMS is sent utilizing the same physical resources (including time, frequency, a code channel, a scrambling code and midamble) at the same time, thus a User Equipment even at the edge of the cell or sector can receive useful signals from different cells or sectors, and may merge energy of all the received useful signals at an air interface directly. Therefore, Quality of Service (QoS) of MBMS in the whole SFN area can be improved.

Referring to FIG. 1, which shows a network structure topology of an SFN. Now the existing implementation of the SFN technology in E-MBMS of 3GPP will be described by way of example, based on the network structure of the SFN (where each cell is composed of three sectors, and the base stations of the three sectors share the same address) shown in FIG. 1.

The same time resource, frequency resource, scrambling code and midamble used by a broadcast/multicast service are allocated to all the sectors in the SFN shown in FIG. 1, and all User Equipments (UEs) in the SFN also employ the allocated time resource, frequency resource, scrambling code and midamble to receive the broadcast/multicast service. That is, from the perspective of a UE, as long as signals from the sectors in the SFN fall into the window of a multi-path receiver of the UE, the UE can directly merge energy of all the signals falling into the receiving window, thereby greatly enhancing the performance of receiving the broadcast/multicast service.

Now an implementation of transmitting a multimedia broadcast/multicast service in the SFN in the prior art will be described by way of example.

To transmit a broadcast/multicast service in a plurality of cells or sectors, a Radio Network Controller (RNC) allocates the broadcast/multicast service resources to the cells or sectors, assigns the scrambling code and midamble (which are different from the existing scrambling code and midamble) used for the broadcast/multicast service, and notifies each Node B and UE about the allocated broadcast/multicast service resources and the assigned scrambling code and midamble via signaling. The Node B of each cell or sector employs such particular codes to form a broadcast/multicast service burst and transmits the burst over the same time and frequency resources. The UE receives at the corresponding resource location the same bursts transmitted simultaneously by a plurality of cells or sectors, then performs channel estimation using the assigned midamble, and descrambles the data using the assigned scrambling code to obtain the desired broadcast/multicast service data.

The implementation of transmitting the multimedia broadcast/multicast service in the SFN in the prior art includes the following main processes.

Process 1: The network side initiates a broadcast/multicast service and notifies an RNC by signaling. The RNC determines cells or sectors in which the broadcast/multicast service is to be transmitted.

Process 2: The RNC allocates broadcast/multicast service resources to the determined cells or sectors. In order to facilitate the implementation of macro diversity, the RNC may allocate the same time and frequency resources (e.g. the same frequency point, slot and code channel) and assign the scrambling code and midamble used for the broadcast/multicast service.

The assigned scrambling code and midamble herein are different from those used for the non-broadcast/multicast service.

A group of scrambling codes and midambles in close correlation with the existing scrambling code and midamble may be preset for the broadcast/multicast service and used as the dedicated scrambling codes and midambles for the broadcast/multicast service, thus forming a broadcast/multicast service code group table, which may be stored in the RNC, UE and Node B. Thus, when allocating resources for a certain broadcast/multicast service, the RNC may select a pair of codes from the code group table and notify the Node B and the UE of the corresponding code group identifier, thus reducing the signaling load.

Process 3: When transmitting the broadcast/multicast service, the Node B forms a broadcast service burst using the assigned scrambling code, midamble and corresponding data, and transmits the broadcast service burst over the resources allocated by the RNC.

Process 4: According to the resource allocation information sent by the RNC, the UE receives the signals over the corresponding resources. The UE may receive the signals sent by a plurality of cells or sectors, directly superimpose all the received useful signals at the air interface, and perform channel estimation according to the assigned midamble to obtain the total channel estimation result from the plurality of cells or sectors to the UE, then de-spread the data according to the channel estimation result, descramble the de-spread data using the assigned scrambling code, thereby obtaining the desired broadcast/multicast service data.

It can be seen from the above processes that the RNC only needs to assign the scrambling code and midamble used for the broadcast/multicast service burst when allocating resources and notify the same to the Node Bs and the UE, and the Node Bs and the UE respectively send and receive the broadcast/multicast service data according to the assigned scrambling code and midamble, in this way, the transmission of the multimedia broadcast/multicast service can be implemented easily, thus the quality of the broadcast/multicast service signal received by the UE is improved, and the coverage area of the broadcast/multicast service is enlarged. In addition, the broadcast/multicast service is typically transmitted in hot cells or sectors, which generally have small radiuses, therefore the time difference between the signals received by the UE from different cells or sectors can not be too large, which has no high demand for the physical layer process of the UE.

The above technology greatly improves the transmission of traditional MBMS, but has some defects still to be solved. The deep fading phenomenon caused by the superimposition of signals received from a plurality of cells or sectors is not solved yet. In the deep fading phenomenon, since the same signals are transmitted, for example, in two cells or sectors, if the signals arrive at the receiver of the UE simultaneously but have opposite phases, the quality of the received signals will be deteriorated very seriously. This phenomenon is particularly significant in the stationary environment, in the low speed environment and at the edge of two adjacent sectors at the same station address.

SUMMARY OF THE INVENTION

Embodiments of the invention provide a method, a system and a base station for transmitting a multimedia broadcast/multicast service in a single frequency network, to eliminate the deep fading phenomenon of signals in the prior art, which likely occurs in the stationary environment, in the low speed environment and at the edge of adjacent sectors at the same station address during the transmission of the multimedia broadcast/multicast service in the single frequency network.

The technical solutions according to the embodiments of the invention include as follows.

A method for transmitting a multimedia broadcast/multicast service in a single frequency network, including processes of:

A. sending, by a Radio Network Controller, broadcast/multicast service data to base stations of target cells or sectors, allocating the same time and frequency resources, scrambling code and midamble to the cells or sectors to transmit the broadcast/multicast service data, and distributing information of the allocated resources, the scrambling code and midamble to the base stations of the target cells or sectors and a UE; and B. rotating, by each of the base stations, a broadcast/multicast service burst signal to be sent by a random phase, and sending the rotated signal to the UE using the time and frequency resources allocated by the Radio Network Controller.

Preferably, after Process B, the method further includes:

receiving, by the UE, the broadcast/multicast service burst signals from the base stations over the time and frequency resources, performing channel estimation and de-spreading and descrambling processes on the received signals using the allocated scrambling code and midamble, to obtain the broadcast/multicast service data.

Preferably, between Process A and Process B, the method further includes:

performing, by each of the base stations, frequency spreading and scrambling processes on the broadcast/multicast service data distributed by the Radio Network Controller using the allocated scrambling code, and forming the broadcast/multicast service burst signal using the processed data and the allocated midamble.

Preferably, the rotation of the broadcast/multicast service burst signal by the random phase is implemented by multiplying the broadcast/multicast service burst complex signal in baseband form, intermediate frequency form, or radio frequency form by a complex signal $\cos(\theta)+j*\sin(\theta)$, where $\theta$ is a phase rotating factor and is a random number or pseudo random number evenly distributed in a range of $0\sim2\pi$.

Preferably, a cycle of the random phase is one or more subframes, or one or more slots.

Preferably, the phase rotating factor sequences adopted by a plurality of cells or sectors serving the same UE are not correlative.

A system for transmitting a multimedia broadcast/multicast service in a single frequency network, including:

a Radio Network Controller, adapted to send broadcast/multicast service data to base stations of target cells or sectors, allocate the same time and frequency resources, scrambling code and midamble to the cells or sectors to transmit the broadcast/multicast service data, and distribute information of the allocated resources, the scrambling code and midamble to the base stations and a UE; and the base station, adapted to rotate the broadcast/multicast service burst signal to be sent by a random phase, and send the rotated signal to the UE using the time and frequency resources allocated by the Radio Network Controller.

Preferably, the system further includes:

a UE, adapted to receive the broadcast/multicast service burst signals from different base stations over the time and frequency resources, perform channel estimation, de-spreading and descrambling processes on the received signals using the allocated scrambling code and midamble, to obtain the broadcast/multicast service data.

A base station, including:

a phase processing module, adapted to rotate a broadcast/multicast service burst signal to be sent by a random phase; and a signal sending module, adapted to send the rotated signal to a UE using the time and frequency resources allocated by a Radio Network Controller.

Preferably, the base station further includes:

a burst forming module, adapted to perform frequency spreading and scrambling processes on the broadcast/multicast service data distributed by the Radio Network Controller, using the allocated scrambling code, and form the broadcast/multicast service burst signal using the processed data and the allocated midamble.

The advantages of the invention are as follows.

According to the technical solutions of the embodiments of the invention, the base stations of different cells or sectors in the single frequency network rotate, by a random phase, the broadcast/multicast service burst signals to be transmitted to the UE, to change the waveforms of the burst signals, thus eliminating the deep fading phenomenon of signals in the prior art which occurs if signals from two base stations arrive at the UE simultaneously and have opposite phases in the stationary environment, in the low speed environment and at the edge of adjacent sectors at the same station address during the transmission of the multimedia broadcast/multicast service in the single frequency network. Therefore, the transmission performance of the broadcast/multicast service under these environments is greatly enhanced while the receiver performance of the UE under these environments is improved. The technical solutions according to the embodiments of the invention can be easily implemented and no additional hardware cost is required.

BRIEF DESCRIPTION OF THE DRAWINGS

FIG. 1 is a network structure topology of an SFN in the prior art;

FIG. 2 is a flow chart of a method for transmitting a multimedia broadcast/multicast service in a single frequency network according to an embodiment of the invention;

DETAILED DESCRIPTION OF THE EMBODIMENTS

Figure 3:
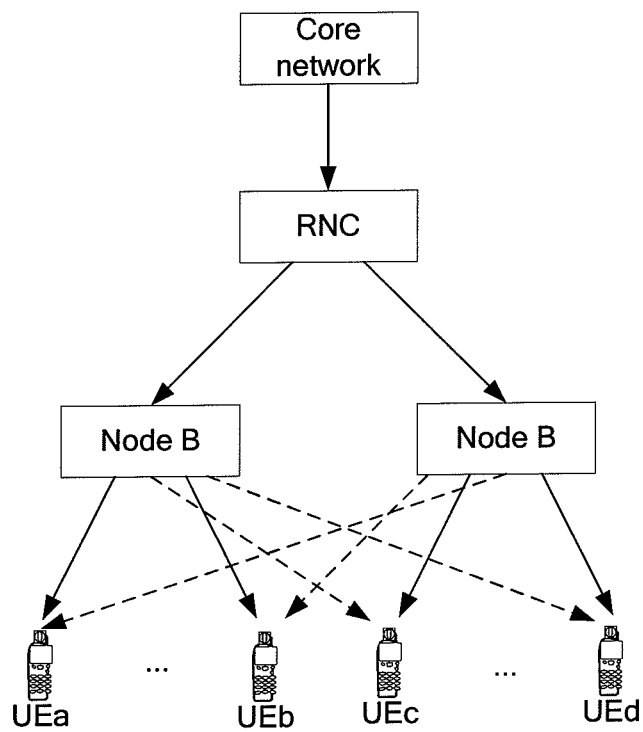
FIG. 3 is a structural block diagram of a system for transmitting a multimedia broadcast/multicast service in a single frequency network according to an embodiment of the invention.

The main technical conception of the embodiments of the invention is that the base stations of different cells or sectors in the single frequency network rotate, by a random phase, the broadcast/multicast service burst signals to be transmitted to the UE to change the waveforms of the burst signals, in order to eliminate the deep fading phenomenon of signals in the prior art which occurs if signals from two base stations arrive at the UE simultaneously and have opposite phases in the stationary environment, in the low speed environment and at the edge of adjacent sectors at the same station address during the transmission of the multimedia broadcast/multicast service in the single frequency network.

Now the specific implementation in the embodiments of the invention will be described in detail with reference to the accompanying drawings.

Referring to FIG. 2, which is a flow chart of a method for transmitting the multimedia broadcast/multicast service in the single frequency network according to an embodiment of the invention, the main implementation procedure of the method is as follows.

Process 20: The network side initiates a broadcast/multicast service and sends data of the broadcast/multicast service to an RNC. The RNC determines the target cells or sectors of the broadcast/multicast service data, i.e. the cells or sectors in which the broadcast/multicast service data should be transmitted.

Process 21: The RNC allocates the same time and frequency resources, scrambling code and midamble to the target cells or sectors of the broadcast/multicast service, distributes information of the allocated time and frequency resources, scrambling code and midamble to the Node Bs and UEs of the target cells or sectors, and sends the broadcast/multicast service data to the Node Bs of the target cells or sectors.

The scrambling code and midamble allocated to the broadcast/multicast service by the RNC are different from those adopted by the non-broadcast/multicast service.

To reduce the signaling load, RNC may preset a group of scrambling codes and midambles in close correlation with the existing scrambling code and midamble for the broadcast/multicast service, which are used as the dedicated scrambling codes and midambles for the broadcast/multicast service, thus forming a broadcast/multicast service code group table, which may be stored in the RNC, UE and Node B. When allocating resources for a certain broadcast/multicast service, the RNC selects a pair of scrambling code and midamble from the code group table, and notifies the corresponding code group identifier to the Node Bs and UEs, thereby reducing the signaling load.

Process 22: Each of the Node B performs frequency spreading and scrambling processes on the broadcast/multicast service data distributed by the RNC using the allocated scrambling code, and forms a broadcast/multicast service burst signal using the processed data and the allocated midamble.

Process 23: The Node B rotates the broadcast/multicast service burst signal to be sent by a random phase, and sends the rotated signal to a UE using the time and frequency resources allocated by the RNC.

The Node B may rotate the broadcast/multicast service burst signal to be sent by the random phase in three ways as respectively illustrated below.

In a first way, the complex signal of the broadcast/multicast service burst in the form of baseband signal is multiplied by a complex signal $\cos(\theta)+j*\sin(\theta)$, where $\theta$ is a phase rotating factor and is a random number or pseudo random number evenly distributed in a range of $0\sim2\pi$. For a network in which multiple carriers are used by a single transmitter, each of the carriers may be processed with the same or a different phase rotating factor.

In a second way, the complex signal of the broadcast/multicast service burst in the form of intermediate frequency signal is multiplied by a complex signal $\cos(\theta)+j*\sin(\theta)$, where $\theta$ is a phase rotating factor and is a random number or pseudo random number evenly distributed in a range of $0\sim2\pi$. For a network in which multiple carriers are used by a single transmitter, each of the carriers may be processed with the same or a different phase rotating factor.

In a third way, the complex signal of the broadcast/multicast service burst in the form of radio frequency signal is multiplied by a complex signal $\cos(\theta)+j*\sin(\theta)$, where $\theta$ is a phase rotating factor and is a random number or pseudo random number evenly distributed in a range of $0—2\pi$. For a network in which multiple carriers are used by a single transmitter, each of the carriers may be processed with the same or a different phase rotating factor.

The cycle of the random phase may include one or more subframes, or one or more slots. When the cycle of the random phase is in unit of subframe, signals in the whole subframe may be rotated by a phase, and it is also possible to rotate only the signals in an MBMS slot by the phase, or rotate only the signals in a service slot by the phase.

To introduce the random phase rotation to the different cells or sectors in the SFN, it should be assured that the phase rotating factor sequences adopted by a plurality of cells or sectors serving the same UE are not correlative.

In order to assure that the phase rotating factor sequences introduced for a plurality of cells or sectors serving the same UE are not correlative, it should be assured that the phase rotating factor sequences of the cells or sectors in a certain range are different, or the same phase rotating factor sequence with a different phase (the phase of the sequence) is used for each of the cells or sectors.

For the phase rotating factor sequence generated by using a random seed, the generation of the seed may be combined with the time and the identifier of a Node B, to assure that the seeds used simultaneously by different cells or sectors with a short distance to each other are different. Alternatively, a different phase rotating factor sequence is allocated to each cell or sector, where the sequence may be derived from one sufficiently long sequence, thus different shifted sequences are allocated to the cells or sectors with a short distance to each other by planning the sufficiently long sequence, or the sequences may be different sequences determined (for example, sequences already allocated to the cells or sectors, such as the scrambling code or midamble).

Process 24: The UE receives the broadcast/multicast service burst signals from different base stations over the time and frequency resources allocated by the RNC, performs channel estimation on the received signals by using the allocated midamble to obtain the total channel condition from the cells or sectors to the UE, then the UE de-spreads the data according to a result of the channel estimation, descrambles the de-spread data using the assigned scrambling code, to obtain the broadcast/multicast service data.

The use of the above method in the embodiment of the invention can efficiently avoid the deep fading phenomenon of signal, which occurs in the stationary environment, in the low speed environment and at the edge of adjacent sectors at the same station address, thereby greatly enhancing the transmission performance of the broadcast/multicast service under these environments.

In correspondence with the above method in the embodiment of the invention, embodiments of the invention further provide a system and a base station for transmitting a multimedia broadcast/multicast service in a single frequency network.

Referring to FIG. 3, which is a structural block diagram of a system for transmitting a multimedia broadcast/multicast service in a single frequency network according to an embodiment of the invention, the system includes RNC, Node B and UE.

The RNC is adapted to send the broadcast/multicast service data initiated by the network side to the Node Bs of target cells or sectors, allocate the same time and frequency resources, scrambling code and midamble to the cells or sectors to transmit the broadcast/multicast service data, and distribute information of the allocated resource, scrambling code and midamble to the Node Bs and the UE.

The Node B is adapted to perform frequency spreading and scrambling processes on the broadcast/multicast service data distributed by the RNC by using the allocated scrambling code, form a broadcast/multicast service burst signal using the processed data and the allocated midamble, rotate the broadcast/multicast service burst signal by a random phase, and send the rotated signal to the UE using the time and frequency resources allocated by the RNC.

The UE is adapted to receive the broadcast/multicast service burst signals from different Node Bs over the time and frequency resources, perform channel estimation, de-spreading and descrambling processes on the received signals using the allocated scrambling code and midamble, to obtain the broadcast/multicast service data.

For the specific operation of the system in the embodiment of the invention, reference may be made to the above description of the method of the invention, and further description of the operation of the system is omitted herein.

Figure 4:
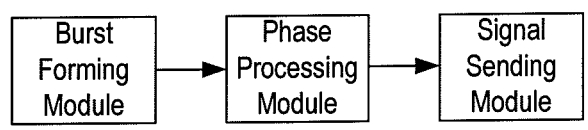
FIG. 4 is a structural block diagram of a base station according to an embodiment of the invention.

Referring to FIG. 4, which is a structural block diagram of a base station according to an embodiment of the invention, the base station mainly includes:

a burst forming module, adapted to perform frequency spreading and scrambling processes on the broadcast/multicast service data distributed by a Radio Network Controller by using the allocated scrambling code, and form a broadcast/multicast service burst signal using the processed data and the allocated midamble;

a phase processing module, adapted to rotate the broadcast/multicast service burst signal to be sent by a random phase; and a signal sending module, adapted to send the rotated signal to a UE using the time and frequency resources allocated by the Radio Network Controller.

For the specific operation of the base station in the embodiment of the invention, reference may be made to the above description of the method of the invention, and further description of the operation of the base station is omitted herein.

It will be appreciated that one skilled in the art may make various modifications and alterations to the present invention without departing from the spirit and scope of the present invention. Accordingly, if these modifications and alterations to the present invention fall within the scope of the claims of the present invention and their equivalents, the present invention intends to include all these modifications and alterations.

The invention claimed is:

1. A method for transmitting a multimedia broadcast/multicast service in a single frequency network, comprising:

A. sending, by a Radio Network Controller, broadcast/multicast service data to base stations of target cells or sectors, allocating the same time and frequency resources, scrambling code and midamble to the cells or sectors to transmit the broadcast/multicast service data, and distributing information of the allocated resources, the scrambling code and midamble to the base stations of the target cells or sectors and UEs; and B. rotating, by each of the base stations, a broadcast/multicast service burst signal to be sent by a random phase, and sending the rotated signal to the UE using the time and frequency resources allocated by the Radio Network Controller;

wherein, the rotation of the broadcast/multicast service burst signal by the random phase is implemented by multiplying the broadcast/multicast service burst complex signal in baseband form, intermediate frequency form or radio frequency form by a complex signal cos($\theta$)+j*sin($\theta$), where $\theta$ is a phase rotating factor and is a random number or pseudo random number evenly distributed in a range of 0~2$\pi$.

2. The method of claim 1, wherein, after Process B, the method further comprises:

receiving, by the UE, the broadcast/multicast service burst signals from the base stations over the time and frequency resources, performing channel estimation, and de-spreading and descrambling processes on the received signals using the allocated scrambling code and midamble, to obtain the broadcast/multicast service data.

3. The method of claim 1, wherein, between Process A and Process B, the method further comprises:

performing, by each of the base stations, frequency spreading and scrambling processes on the broadcast/multicast service data distributed by the Radio Network Controller using the allocated scrambling code, and forming the broadcast/multicast service burst signal using the processed data and the allocated midamble.

4. The method of claim 1, wherein, a cycle of the random phase is one or more subframes, or one or more slots.

5. The method of claim 1, wherein, the phase rotating factor sequences adopted by a plurality of cells or sectors serving for the same UE are not correlative.

* * * * *